(12) United States Patent
Stokking et al.

(10) Patent No.: US 9,237,179 B2
(45) Date of Patent: Jan. 12, 2016

(54) METHOD AND SYSTEM FOR SYNCHRONIZING THE OUTPUT OF TERMINALS

(75) Inventors: Hans Maarten Stokking, The Hague (NL); Mattijs Oskar van Deventer, Leidschendam (NL); Fabian Arthur Walraven, Groningen (NL); Omar Aziz Niamut, Vlaardingen (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 523 days.

(21) Appl. No.: 12/746,133

(22) PCT Filed: Dec. 5, 2008

(86) PCT No.: PCT/EP2008/010355
§ 371 (c)(1),
(2), (4) Date: Jun. 3, 2010

(87) PCT Pub. No.: WO2009/071321
PCT Pub. Date: Jun. 11, 2009

(65) Prior Publication Data
US 2010/0257280 A1    Oct. 7, 2010

(30) Foreign Application Priority Data

Dec. 5, 2007    (EP) .................................... 07023550
Sep. 12, 2008    (EP) .................................... 08016109

(51) Int. Cl.
*G06F 15/16* (2006.01)
*H04L 29/06* (2006.01)
*H04J 3/06* (2006.01)

(52) U.S. Cl.
CPC ............. *H04L 65/80* (2013.01); *H04J 3/0661* (2013.01); *H04J 3/0682* (2013.01)

(58) Field of Classification Search
CPC ... H04L 47/32; H04L 65/608; H04L 65/4076; H04L 29/06027; H04L 12/5693; H04L 47/22; H04L 47/10; H04L 47/283; H04L 43/0864; H04L 43/106

USPC .......................................................... 709/231
See application file for complete search history.

(56) References Cited

U.S. PATENT DOCUMENTS 6,239,793 B1    5/2001    Barnert et al.
6,360,271 B1 *  3/2002    Schuster et al. .............. 709/231
(Continued)

FOREIGN PATENT DOCUMENTS

EP    2053822    4/2009

OTHER PUBLICATIONS

Article "The IP Multimedia Subsystem in Next Generation Networks" by Gilles Bertrand published in May 30, 2007.*
(Continued)

*Primary Examiner* — Kevin Bates
*Assistant Examiner* — Sm Rahman
(74) *Attorney, Agent, or Firm* — McDonnell Boehnen Hulbert & Berghoff LLP

(57) ABSTRACT

A Method is described for synchronizing the output of terminals. The method according to the invention may be used in a system comprising a station, which transmits a packetized stream to at least a first and second terminal. Each terminal comprises a variable delay unit and each terminal is connected through a low-delay communication channel to at least one synchronization unit for calculating delay information. Further, each terminal is capable of determining media reference information of a received media unit from the stream. The method comprising the steps of providing one or more low delay communication channels between the terminals and a synchronization unit; the synchronization unit calculating delay information on the basis of synchronization information received from the terminals via the one or more low delay communication channels; and transmitting the delay information to at least one of the terminals allowing the at least one terminal to delay its output such that the output of the terminals are substantially synchronized.

22 Claims, 6 Drawing Sheets

(56) References Cited

U.S. PATENT DOCUMENTS

| | | | |
|---|---|---|---|
| 2006/0256822 A1* | 11/2006 | Kwong et al. | 370/503 |
| 2007/0115969 A1* | 5/2007 | Isnardi | H04L 47/10 370/389 |
| 2007/0242700 A1* | 10/2007 | Moote | H04N 21/2221 370/486 |
| 2008/0022320 A1* | 1/2008 | Ver Steeg | H04N 21/2353 725/78 |

OTHER PUBLICATIONS

The IP Multimedia Subsystem in Next Generation Networks by Gilles Bertrand, Published in May 30, 2007, pp. (1-9).*

"Telecommunications and Internet Converged Services and Protocols for Advanced Networking (TISPAN); NGN Integrated IPTV Subsystem Architecture", Draft ETSI TS 182 028 V3.1.0 (Nov. 2008), XP-002512121, pp. 1-45.

International Search Report and Written Opinion, PCT International Application No. PCT/EP2008/010355 dated Feb. 9, 2009.

Ishibashi, Yutaka et al., "A Group Synchronization Mechanism for Stored Media in Multicast Communications", INFOCOM '97, Sixteenth Annual Joint Conference of the IEEE Computer and Communications Societies, Kobe, Japan, Apr. 7-11, 1997, vol. 2, pp. 692-700.

Segui, Fernando Boronat et al., "Multimedia Group Synchronization Algorithm Based on RTP/RTCP", Multimedia 2006, ISM '06, Eighth IEEE International Symposium, Dec. 2006, pp. 754-757.

Ishibashi, Yutaka et al., "A Group Synchronization Mechanism for Live Media in Multicast Communications", Global Telecommunications Conference, Nov. 3-8, 1997, vol. 2, pp. 746-752.

Nunome, Toshiro et al., "An Application-Level QoS Comparison of Inter-Destination Synchronizing Schemes for Continuous Media Multicasting", IEEE Global Telecommunications Conference, Dec. 1-5, 2003, vol. 7 of 7, pp. 3602-3608.

Partial translation of Japanese Patent Application No. 2004-051761, "Streaming Content Distribution Control System, Program and Recording Medium Storing the Same" filed Feb. 26, 2004.

* cited by examiner

METHOD AND SYSTEM FOR SYNCHRONIZING THE OUTPUT OF TERMINALS

The present invention is a United States National Stage application of International Application Serial No. PCT/EP2008/010355 filed on Dec. 5, 2008, which itself claims priority to European Patent Applications EP 07023550.2 filed in the European Patent Office on Dec. 5, 2007 and EP 08016109.4 filed in the European Patent Office on Sep. 12, 2008, the entire contents of all of which are incorporated herein by reference.

FIELD OF THE INVENTION

The invention relates to a method and a system for synchronizing the output of terminals. The invention further relates to a synchronization unit and a terminal for use in such system.

BACKGROUND OF THE INVENTION

New multi-media techniques such as Voice over IP (VoIP) and Internet Protocol Television (IPTV) open a whole range of new multi-media services. One type of these services enables a group of users to separately watch the same TV channel, while communicating with each other via text, audio and/or video using a separate real-time communication channel (e.g. VoIP) for the direct communication. Such services require that the output signal of the terminals is transmitted at the same time to all users in the group so that each user will experience a specific TV moment (e.g. a goal in a live football match) at the same time. In other words, the outputs of the display devices in the group, e.g. televisions, PDAs, PCs or a combination thereof, should be synchronized.

In an IPTV system the TV channel signal is typically transmitted as one or more packetized streams over a high-bandwidth IP network of an operator via edge routers and access nodes to the terminals of the subscribers to such services. During transmission of the streams, the packets are subjected to unknown delays in the network such as transmission delays, differences in network routes and differences in coding and decoding delays. As a consequence the temporal relationship between packets of audio and video streams received at one terminal and those received at another terminal will be disturbed.

To stream the IPTV content to the terminals usually the Real-time Transport Protocol (RTP) is used. RTP provides sequence numbering and time stamping. Using RTP the temporal relation in one stream (intra-stream synchronization) and between associated streams (inter-stream synchronization) can be restored.

In order to achieve group-synchronization or inter-destination synchronization (as required by the services as referred to above) further measures are necessary. Several techniques are known and all employ time-stamping and variable-delay buffers in the terminals. A variable-delay buffer is capable of delaying a stream for a certain amount of time.

In the article "An Application-Level QoS Comparison of Inter-Destination Synchronization Schemes for Continuous Media Multicasting" by Nunome et al. (IEICE trans. Commun. vol. 87, 2004, pp. 3057-3067) two types of inter-destination synchronization schemes are described. A first type uses a central synchronization master, which collects timing information from all terminals in the group and adjusts the output timing by distributing control packets to the terminals. A second type regards a distributed control scheme, wherein each terminal multicasts all timing information to all other terminals in the group. Implementation of such schemes in a typical IPTV system introduces however certain problems. One problem related to the schemes is the requirement of an absolute or central clock, that synchronizes all local clocks prior to the inter-destination synchronization of the streams. Such local clock synchronization may be difficult to achieve in practice. A further problem related to the prior art is the limited scalability. Synchronization control packets are distributed using dedicated multicast channels, which are a limited resource, and a central synchronization master may only be capable of handling a certain number of terminals.

One way of achieving group-synchronization in an IPTV system is the synchronization of the network nodes in the network of the operator so that all viewers connected with a terminal, e.g. a set-top box, to these synchronized network nodes are capable of viewing the broadcasted program at the same time. That way, the terminals will always be in sync, irrespective whether a particular service requires group-synchronization. This solution, which is described in more detail in a related European patent application no. 07020737.8, requires adaptation of the network nodes in the network.

It is desirable to provide group-synchronization for particular services without modification of the existing network infrastructure of the provider.

SUMMARY OF THE INVENTION

It is an object of the invention to reduce or eliminate at least one of the drawbacks known in the prior art and to provide to provide in a first aspect of the invention a method of for synchronizing the output of at least two terminals, wherein the method comprises the steps of: providing one or more low delay communication channels between the terminals and a synchronization unit; the synchronization unit calculating delay information on the basis of synchronization information received from the terminals via the one or more low delay communication channels; and, transmitting the delay information to at least one of the terminals allowing the at least one terminal to delay its output such that the output of the terminals are substantially synchronized.

The invention is based on the insight that a certain group of services, which enable a group of users to communicate with each other via text, audio and/or video, while watching the same TV channel, may often use a separate, high quality, low-delay communication channel for communication. The low-delay communication channel thus provides a very efficient and relatively fast connection for exchanging synchronization information between the terminals of the group of users and the one or more synchronization units. By using the method according to the invention, such low delay connection eliminates the use of an absolute clock for the synchronization of the local clocks of the terminals, prior to the inter-destination synchronization of the media stream. Moreover, the method provides a simple and low cost solution for providing group-synchronization in certain IPTV services, which does not require adaptation of the infrastructure of the network of the provider. The method only synchronizes those terminals, which really require group-synchronization.

In one embodiment the steps as defined by the method according to the invention are performed by the synchronization unit.

In a further embodiment each terminal comprises an input for receiving a multi-media signal and an output for transmitting the multi-media signal to an information presentation unit and each terminal comprises a variable delay unit for delaying the output signal wherein the method further comprising the steps of: transmitting a multi-media stream to the input of the terminals, preferably the multi-media stream comprising media units; delaying the output signal according to the received delay information.

Using terminals with variable delay units (buffers), each terminal can delay the output locally. This has the advantage that not the whole network of an operator needs to be equipped with variable delay buffers in the paths of all streams.

In yet a further embodiment the method further comprises the step of: each terminal sending synchronization information, preferably in response to a synchronization request, via a low delay communication channel to the synchronization unit, the synchronization information comprising media unit reference (MUR) information representing the position of a media unit in a multi-media stream.

In further embodiments the MUR information comprises a frame number or a sequence number.

Because of the use of the low-delay channel, the time of receipt of the synchronization information by the synchronization unit, is substantially the same as the time the synchronization information was determined and sent by the terminal. Therefore the local clocks no longer need to provide time (stamp) information of media units received with the synchronization information, and the local clocks of the terminals need no longer be synchronized, as was the case with prior art techniques. Only information about the relative position of a media unit in a stream (represented by MUR information) is now required from the terminals.

In yet a further embodiment, the method further comprises the steps of: adding one or more time stamps to the MUR information received from the terminal; providing information on the frame rate of the multi-media stream received by the terminals; calculating delay information for each terminal on the basis of the frame rate information and the time-stamped MUR information; sending delay information to at least one of the terminals.

By adding time stamps to the MUR information, and being provided with the frame rate(s) of the stream(s), the synchronization unit may calculate the delay information (applicable delay) for each terminal involved in the synchronization. Since these delays are relative to the slowest stream (terminal), when only two terminals are involved in the synchronization, only one terminal need to be provide with delay information, taking the other terminal as a reference.

In one embodiment the method further comprises the steps of: the synchronization unit sending a synchronization request, preferably simultaneously, via one or more low delay communication channels to the terminals; providing information on the frame rate of the multi-media stream received by the terminals; calculating delay information for each terminal on the basis of the frame rate information and the MUR information; sending delay information to at least one of the terminals.

The synchronization process may be terminal initiated or synchronization unit initiated. In the latter case, the synchronization unit will send a synchronization request to the terminals involved. If the request is sent simultaneously to all terminals involved via a low delay channel and the results (MUR information) are immediately sent back from the terminals to the synchronization unit via the low delay channels, all results will substantially arrive at the same time. Consequently, depending on the level of synchronization required, the step of adding time stamps, may be left away and is no longer needed in the calculations of delay information. This has the advantage that the use of a clock and means for time-stamping may no longer be needed by the synchronization unit, making the process and used equipment simpler and more efficient.

In a further embodiment, the low delay communication channel, used to transmit synchronization information to the synchronization unit, is being established as part of a communication session or a broadcast session, more preferably a broadcast session as defined in ETSI TS 182 027.

This has the advantage that more efficient use of existing network resources is made in executing the method according to the invention.

In further embodiments the low delay communication channel is a Voice over IP (VoIP) channel, an USSD based channel over a GSM, UMTS or LTE network, an QoS-controlled channel in an IMS session, a dedicated channel in a communication session or a broadcast session, a dedicated Ethernet VLAN channel, a dedicated MPLS channel or a dedicated channel used by an IP Diffserv stream.

In one embodiment the synchronization information is carried by a stream within a SIP session associated with the low-delay communication channel. In another embodiment the synchronization information is carried by the RTP protocol associated with the low-delay communication channel or carried by the RTCP protocol associated with the RTP streams for audio, video and/or text or carried by the codec(s) for audio, video and/or text.

The method allows the synchronization information to be carried by the protocol which is used for setting up and maintaining the low-delay communication channel (or session) between the terminals in a group to which the terminals are connected to. In other words, one or more protocols for providing group synchronization is piggybacked over the protocols used for setting up and maintaining the low-delay communication channel.

The synchronization unit may be located in a server, preferably a SIP based application server, or, alternatively, in another embodiment the synchronization unit may be located in the first terminal and/or the second terminal.

In another embodiment the first terminal and the second terminal comprise a first and second synchronization unit respectively, wherein each terminal comprises means for communicating media unit reference information to the other terminal, wherein the method further comprises the steps of: (i) the first synchronization unit receiving via the low-delay communication channel the second media unit reference information transmitted by the second synchronization unit (ii) the second synchronization unit receiving via the low-delay communication channel the first media unit reference information transmitted by the first synchronization unit; and (iii) the first and second synchronization unit calculating a first and second delay respectively on the basis of the first and second media unit reference information enabling the variable delay unit in the first and second terminal to delay transmission such that the output of the group of terminals is substantially synchronized.

This way each terminal comprises a synchronization unit thus enabling each terminal to determine the delay information by itself.

In a another aspect the invention relates to a system for synchronizing the output of at least two terminals, the system comprising a synchronization unit connected via one or more low delay communication channels to at least two terminals, wherein the synchronization unit is configured to calculate delay information on the basis of synchronization information received via one or more low delay communication channels from the terminals and to transmit the delay information to at least one of the terminals allowing each terminal to delay its output such that the output of the terminals are substantially synchronized.

In one embodiment of the system, each terminal comprises an input for a receiving multi-media signal and an output for transmitting the multi-media signal to an information presentation unit and a variable delay unit for delaying the output signal according to the delay information, the system further comprising a station transmitting a multi-media stream to the terminals, the multi-media stream comprising media units.

In a further aspect the invention relates to a synchronization unit for use in a system as described above. The unit comprises: a receiver for receiving via one or more low delay communication channels synchronization information from the terminals; a processor configured to calculate delay information on the basis of the received synchronization information; and, a transmitter for transmitting the delay information to at least one of the terminals.

In one embodiment, the synchronization unit is located in a server, preferably a SIP server, the first terminal and/or the second terminal, or in a conference bridge.

In yet another aspect the invention relates to an terminal for use in a system as described above, wherein the terminal comprises: a receiver configured to receive a synchronization request from the synchronization unit and configured to receive a multi-media stream; a transmitter configured to transmit via one or more low delay communication channels to the synchronization unit and configured to transmit the multi-media signal to an information presentation unit; and, a variable delay unit for delaying transmission of the multi-media signal to the information presentation unit.

In an advantageous embodiment the terminal according to the invention further comprises a synchronization unit configured to calculate delay information on the basis of synchronization information. This eliminates the need for a centrally managed synchronization unit and may be used in network environments where the synchronization service is not provided by the operator.

In exemplary embodiments, the terminal is a set-top box, a home computer, a mobile device, or a gaming console The invention further relates to a computer program product comprising software code portions configured for, when run in the memory of one or more computing devices, preferably one or more network servers or terminals, executing the method steps of the invention as described above.

The invention will be further illustrated with reference to the attached drawing, which schematically show embodiments according to the invention. It will be understood that the invention is not in any way restricted to these specific embodiments.

DETAILED DESCRIPTION

Figure 1:
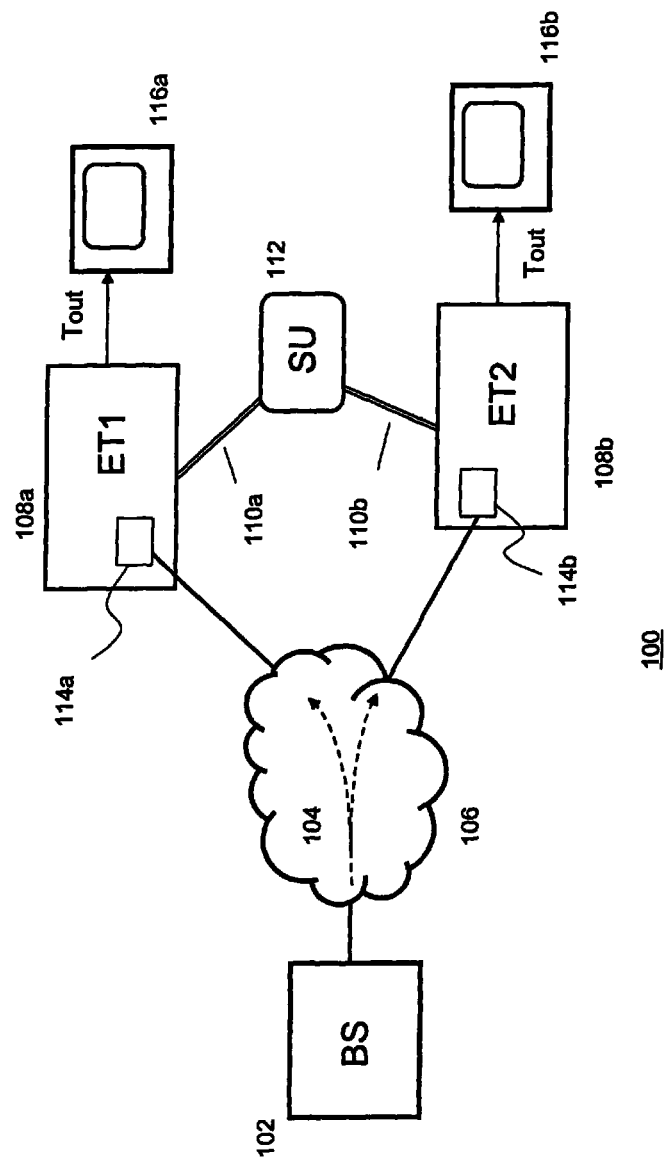
FIG. 1 depicts an exemplary embodiment of a centrally synchronized system.

FIG. 1 illustrates a system 100 according to a first embodiment of the invention. The system comprises a broadcast station (BS) 102, preferably an IPTV system having e.g. an IMS-type architecture, transmitting multimedia content via a network 106, e.g. a high bandwidth IP network, of an operator to a number of access nodes. Examples of access nodes include an Digital Subscriber Line Access Multiplexer (DSLAM), an Cable Modem Termination System (CMTS), an optical access node or an edge router.

The multimedia content may be transmitted via one or more multimedia streams 104 to the access nodes. Typically, the multimedia streams are divided into multi media units, i.e. basic units of data used by the transport protocol, to transport the content over one or more packet-switched networks to the nodes. In one embodiment the multi-media stream may be a packetized (MPEG) transport stream.

The audio, video and/or text content in the stream may be compressed using e.g. MPEG-2, MPEG-4 or another suitable multi-media data compression technique. Further, a transport protocol such as the Real-time Transport Protocol (RTP) and the Real-time Transport Control Protocol (RTCP) may be used to stream the IPTV content over the network. RTCP provides out-of-band control information for an RTP flow. The services provided by RTP include sequence numbering, time stamping and delivery monitoring allowing synchronization of the packets in one stream and between associated streams so that consecutive frames in a stream are played at the correct time and in the correct time intervals.

Each access node is connected to a set of terminals 108a, 108b each being connected to one or more information presentation units 116a,116b. In one embodiment, the terminal may be a conditional access unit, e.g. a set-top box or the like, connected to an information presentation unit. In another embodiment the terminal may be a hardware unit or a combined hardware/software unit located in the information presentation unit. The sets of terminals form a group of terminals to which one or more IPTV services may be delivered. The information presentation unit may be a television, a personal computer, a personal digital assistant (PDA) or any other device capable of presenting multi media content to a user. The terminal may use the Internet Group Management Protocol (IGMP) to request the access node to transmit a TV channel in the multi-media stream to the terminal.

In a first step of the method according to the invention, a communication session between the terminals of the users is established. This communication session, which comprises one or more low-delay communication channels 110a,110b is set up by a particular service which offers real-time communication between the users of the service, while—at the same time—all users may be watching the same TV program in a substantially synchronized way.

Because of the Quality of Service (QoS) requirements, such communication session uses one or more low-delay communication channels for exchanging voice, video, and/or text data. An intrinsic low-delay communication channel may be achieved by an operator-controlled network in which specific traffic flows are prioritized instead of providing only best-effort QoS. For example, in such networks a voice over IP channel may have a maximum acceptable (one-way) latency without QoS degradation of around 150 ms. Other examples of low-delay communication channels are QoS-controlled IMS sessions, and may be established using a dedicated Ethernet virtual LAN (VLAN), a dedicated Multi Protocol Label Switching (MPLS) path or a dedicated IP Diffserv stream. Alternatively a low-delay communication channel may use transport infrastructure completely independent of the channel of the packetized stream. For example a mobile TV scenario where the stream is received via DVB-H and the low-delay communication channel is provided by Unstructured Supplementary Service Data (USSD) or another low-delay channel over a GSM/UMTS network. Such low-delay communication channels typically use different routes, buffers and QoS settings then the communication paths used for TV signals, e.g. multicast streams, which are optimized for efficient use of the network and picture quality. Typically, the Session Initiation Protocol (SIP) is used for setting up the session. Further, RTP and RTCP are used for the transport of the media streams and the associated out-of-band control information.

The one or more low-delay communication channels between the terminals in the session may also be used for exchanging synchronization information between the terminals. This may be achieved by piggybacking the synchronization protocol over one or more protocols used in low-delay communication channels. For instance, the synchronization information may be carried by the RTP stream in a SIP session.

Alternatively the synchronization protocol may use its own dedicated low-delay communication channel as part of the SIP session, or may use in-session SIP signaling, such as the SIP INFO message, if SIP signaling is sent over a low-delay communication channel.

In one embodiment the low-delay communication channel 110a, 110b may be set-up as part of a first broadcast session (e.g. a broadcast session as described in ETSI TISPAN TS 182 027, clause 8.3.1) between a first terminal and an (IPTV) server containing a synchronization unit, and a second broadcast session between a second terminal and the (IPTV) server. Hence, the synchronization information is carried by a low-delay communication channel which is part of a broadcast session. Although the low-delay communication channel is part of the same (broadcast) session as the broadcasted IPTV stream it may have different QoS characteristics to enforce the required low-delay properties.

Alternatively, synchronization information packets may be transported in one or more RTP streams associated with the communication session. In this embodiment SIP establishes separate RTP-streams for audio, video and/or text and the synchronization information packets. Further, the synchronization information may be piggybacked over a RTCP stream associated with one or more RTP streams or, alternatively, over one or more codecs for (de)coding and/or (de)compressing the audio, video and/or text streams.

All these embodiments may make use of the existing infrastructure for a particular service offering real-time communication between the users of the service and—at the same time—synchronization of the TV programs viewed by the users of the service.

The use of one or more low-delay communication channels of the communication session as a low-delay communication channel for exchanging synchronization information allows for several alternative synchronization schemes.

Referring to FIG. 1, synchronization of the output of the terminals to the group of users is realized by a synchronization unit 112 connected via the one or more low-delay communication channels to the terminals. The synchronization unit may be located as a functional unit in a server, e.g. an application server or a dedicated synchronization server, in the network 106. It allows the terminals to compensate for the network delays in the network 106 (e.g. the processing-, queuing-, transmission- and propagation delays in the network and the delay caused by network congestion, which occurs when a link or node is carrying too much data). To that end, each terminal comprises a variable-delay unit, such as a variable delay buffer 114a,114b capable of delaying the transmission of the stream to be transmitted to the presentation units.

In one embodiment, the variable delay unit and the synchronization unit may be implemented in a client-server type model wherein the variable delay unit acts as a synchronization client and the synchronization unit acts as a synchronization server. The synchronisation client (variable delay unit) may have a protocol socket enabling synchronization status information to be sent using a suitable protocol to the synchronization server (synchronization unit), and synchronization settings instructions to be received from the synchronization server. Synchronization status information may include media unit reference information on stream reception (i.e. what media unit was received) and the current delay settings.

The media unit reference information provides an indicator to a specific point in the packetized stream. This indicator may comprise a frame number, timestamps, or sequence numbers. Media unit reference information may also include the perceived frame rate (frames per time unit) of the received media stream. This way, a synchronization unit may be able to calculate delay information, even when terminals with different perceived frame rates participate in the inter-destination synchronization.

Synchronization settings instructions may include instructions on setting the variable delay unit.

The synchronization server (synchronization unit) and synchronization client (variable delay unit) are configured to initiate and terminate synchronization sessions. A synchronization session is initiated when a synchronization client sends an invitation message to the synchronization server, or vice versa. During a synchronization session, the synchronization server and the synchronization client may exchange synchronization status information and synchronization settings instructions. A synchronization session is terminated when the synchronization client sends a termination message to the synchronization server, or vice versa. A synchronization server and a synchronization client may send return messages to accept the invitation to, or to confirm the termination of a synchronization session.

Generally speaking all of the above described types of information related to the synchronization method according to the invention may be referred to as synchronization information.

FIG. 1 illustrates a synchronization scheme in which the synchronization unit 112 centrally collects synchronization information from the terminals via the low-delay communication channel 110a,110b and calculates on the basis of this information delay information for the variable-delay buffer in each terminal. The exemplary algorithm used by the synchronization units assumes that the frame-rate, i.e. the number of frames per second of the streaming content (e.g. video), is known.

Figure 2:
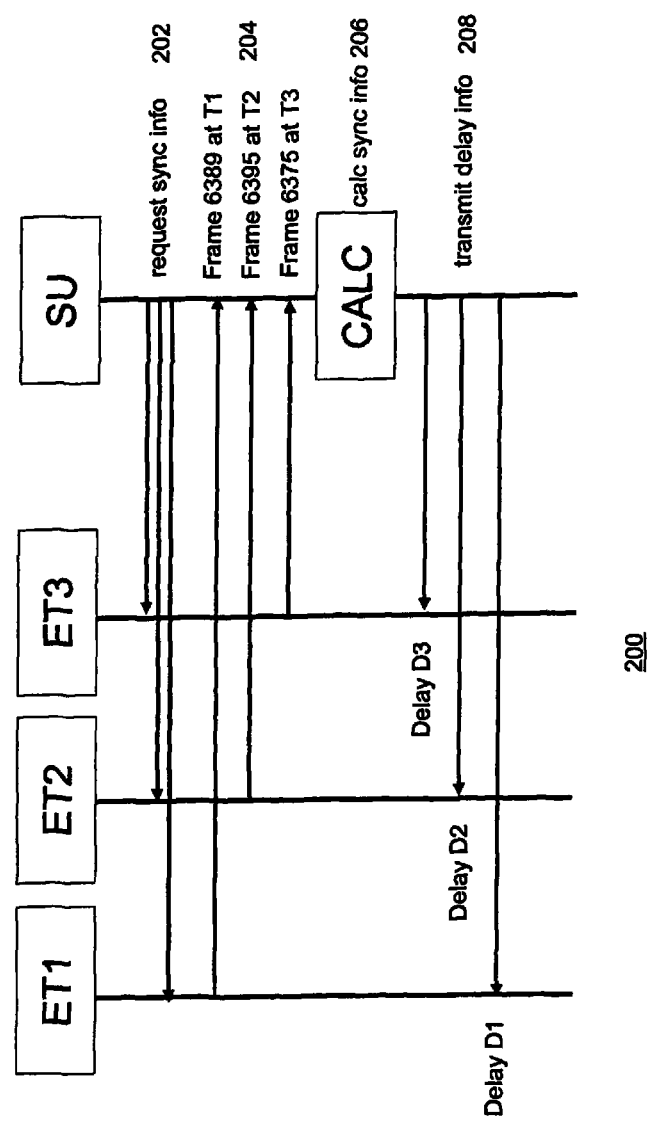
FIG. 2 depicts the flow of information in a system according to the invention comprising three terminals and a central synchronization unit.

The information transfer between the synchronization unit and the terminals is illustrated in more detail in the flow diagram 200 of FIG. 2. In a first step 202, the synchronization unit requests, preferably via the low-delay communication channel, the terminals to send the reference information of a particular media unit (frame) in the stream back to the synchronization unit. Subsequently the terminals will send this information, typically RTP information of a frame including the frame number received at the terminals, to the synchronization unit via the low-delay communication channel (step 204). Next, the synchronization unit 112 is capable of adding a timestamp to the frame numbers and selecting one of the frame numbers, preferably the lowest or highest reported by the terminals, as a reference frame and calculating for each terminal the time related to this reference frame using a known frame-rate. Thereafter, the synchronization unit determines the most "lagged" terminal and calculates the delays for the other terminal or terminals (step 206) and subsequently transmits these delays, preferably via the low-delay communication line, to the terminals (step 208).

With reference to FIG. 2, some of the steps performed by the synchronization are further illustrated in detail as follows: Synchronization unit 112 receives the following media unit reference information from the terminals ET1, ET2 and ET3:

ET1 received frame 6389
ET2 received frame 6395
ET3 received frame 6375

On receiving the reference information the synchronization unit adds a timestamp:

ET1 received frame 6389, received 14:46:59.2645 (T1)
ET2 received frame 6395, received 14:47:05.4112 (T2)
ET3 received frame 6375, received 14:46:59.7600 (T3)

Because of the low-delay channel, the time stamps of the synchronization unit are good representatives of the respective times the frames were actually received by the terminals. Preferably the terminals immediately transmit the media reference information, once the reference information of the last received media unit of the stream has been determined, back to the synchronization unit. Alternatively the terminals may also transmit additional internal delay information (e.g. the delay between determining the media unit reference information and sending the media unit reference information) back to the synchronization unit.

Given an exemplary frame rate of 25 frames per second, the clock times for the lowest frame number, i.e. frame 6375, for each terminal may then be calculated by the synchronization unit as follows:

The first terminal received frame 6375 at approximately T1−(6389−6375)/25=14:46:58.7045 (T1'), the second terminal received frame 6375 at approximately T2−(6395−6375)/25=14:47:04.6112 (T2') and the third terminal received frame 6375 at approximately T3=14:46:59.7600 (T3'=T3):

ET1 received frame 6375 at 14:46:58.7045 (T1')
ET2 received frame 6375 at 14:47:04.6112 (T2')
ET3 received frame 6375 at 14:46:59.7600 (T3'=T3)

The most "lagged" terminal, i.e. the terminal which received the reference frame 6375 last, is terminal ET2. Finally, the synchronization unit determines the delays (D1, D2, D3) for each terminal:

Delay D1 for ET1=T2'−T1'=5.9067
Delay D2 for ET2=0
Delay D3 for ET3=T2'−T3'=4.8512

These delays are subsequently sent, preferably via the low-delay communication channel, to the terminals and used by the variable delay buffer to delay transmission of the stream to the presentation unit. That way the content of a particular frame (media unit) in the originally transmitted stream is transmitted to all users in the group at the same time $T_{out}$ as schematically indicated in FIG. 1.

In an embodiment, the synchronization unit simultaneously requests, via the low-delay channels, the frame numbers from all terminals involved in the inter-destination synchronisation. All terminals will upon receipt of the request, immediately determine the reference information of the last received media unit in the stream and return via the low delay-channel the requested media unit reference information. The synchronization unit may now determine the delays based on only the framerate and received frame numbers, since all media unit reference information are determined at substantially the same time, and therefore time stamps are no longer required. This eliminates the use of a clock in the synchronization units and eliminates steps in the calculation process.

Figure 3:
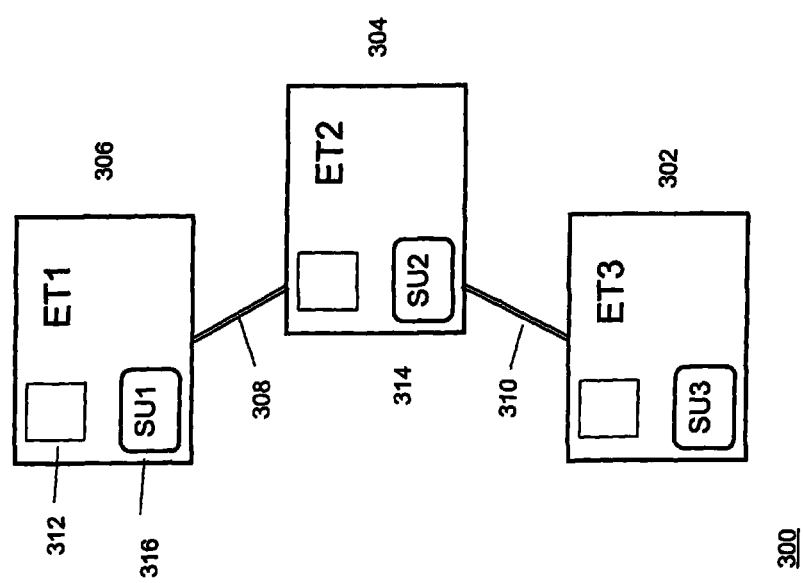
FIG. 3 depicts an exemplary embodiment of a distributed system.

In a further embodiment a number of synchronization units may be used, which are distributed over the network. FIG. 3 depicts an example of such distributed system 300 wherein each terminal 302, 304, 306 comprises a synchronization unit SU1, SU2, SU3. Each synchronization unit is capable of transmitting the media unit reference information to all other synchronization units via the one or more low-delay communication channels 308,310. Each synchronization unit is capable of calculating the appropriate delay time for the variable-delay unit and delaying its output using a variable delay buffer 312 in a similar way as discussed above.

The synchronization unit may be a server in the network hosting the synchronization function, e.g. a software program, or alternatively it may be a functional unit in one or more terminals or in a server, such as a SIP server, or in a conference bridge that connects the media streams of two or more terminals.

In an embodiment, in order to further improve the accuracy of the calculated delay information, the synchronization unit measures or obtains the delay of the low-delay communication channel itself, for example by periodically polling the round-trip time or RTCP information, and adjusts the calculated delay information of the stream for the delay caused by the low-delay communication channel.

Figure 4:
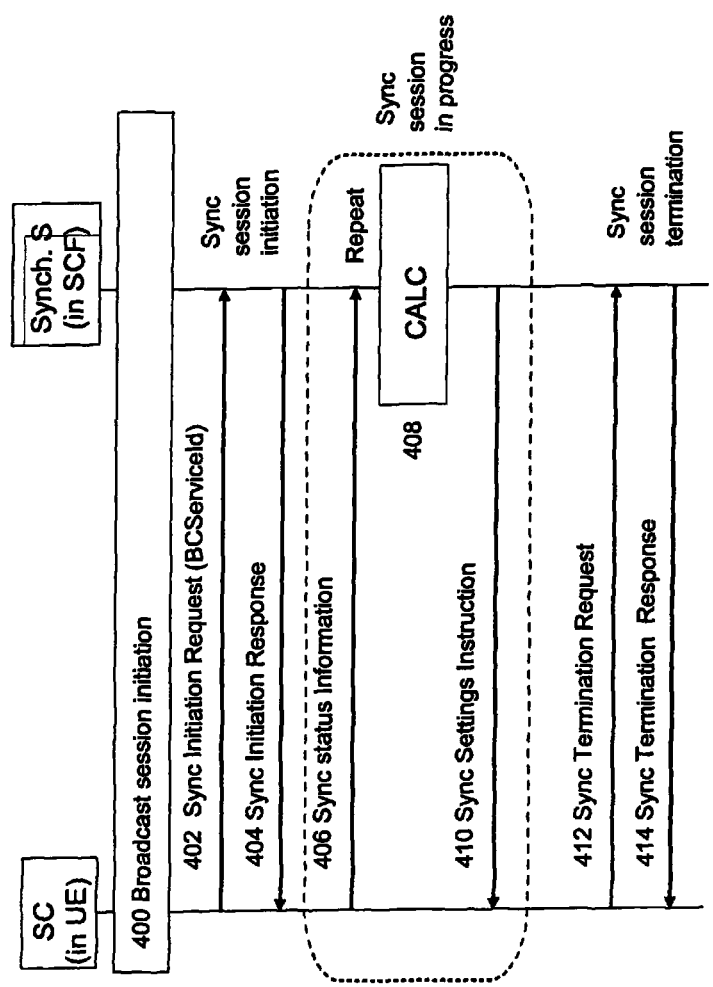
FIG. 4 depicts an exemplary embodiment of a synchronization session.

FIG. 4 depicts an exemplary messaging flow of a synchronization session between a synchronization client (SC) and a synchronization server SynchS according to one embodiment of the invention. The SC and the SynchS may be implemented in an IMS-type architecture wherein the synchronization client may be an elementary function of the User Equipment (UE) and the Synchronization Server (SynchS) may be an elementary function of the IPTV Service Control Function (SCF) as defined in ETSI technical specification TS 182027.

In this embodiment, a synchronisation session for initiating, maintaining and terminating the exchange of synchronization information is established as part of the broadcast session as described in ETSI TISPAN TS 182 027, clause 8.3.1). In other words, the reference point (an interface or a protocol) for setting up, maintaining and terminating the synchronization session is transmitted over the Gm (TS 182 027, clause 6.3) and ISC (TS 182 027, clause 6.8) reference points that are used by the UE to set up a broadcast session with the SCF. The exchange of synchronization information within the synchronization session is transmitted in a low-delay communication channel that is set-up as part of the synchronization session initiation.

The process of setting up a broadcast session and synchronisation session may comprise the following steps:

In a first step 400, a broadcast session is set up between the UE (comprising the SC) and the SCF (comprising the SynchS) following the procedure described in TS 182 027, clause 8.3.1). In a second step 402 the SC sends a synchronization initiation request to the SynchS, indicating that it wants to participate in the inter-destination synchronization process. The request includes the BCServiceId of the to-be-synchronized Broadcast channel. This message and all following messages are sent within the broadcast session that has been established in the first step. In a third step 404 the SynchS confirms the participation of the SC in the inter-destination synchronization process. In a fourth step 406 the SC sends its synchronization status information to the SynchS. In a fifth step 408 the SynchS aggregates synchronization status information from multiple SC's and calculates the appropriate synchronization settings for each SC. Examples of algorithms to calculate the synchronization settings instructions from collected synchronization status information may be calculated using the algorithm as described above in relation with FIG. 2. In a sixth step 410 the SynchS sends a synchronization settings instruction to the SC. Steps 406-410 may be repeated at regular time intervals. When the session needs to be terminated the SC sends, in a seventh step 412 a synchronization termination request, indicating that it is no longer active in the inter-destination synchronization process. In an eighth step 414 the SynchS confirms the termination of the SC's participation in the inter-destination synchronization process.

Optionally the SC may initiate and terminate multiple synchronization sessions within a broadcast session, both consecutive and/or simultaneous.

Figure 5:
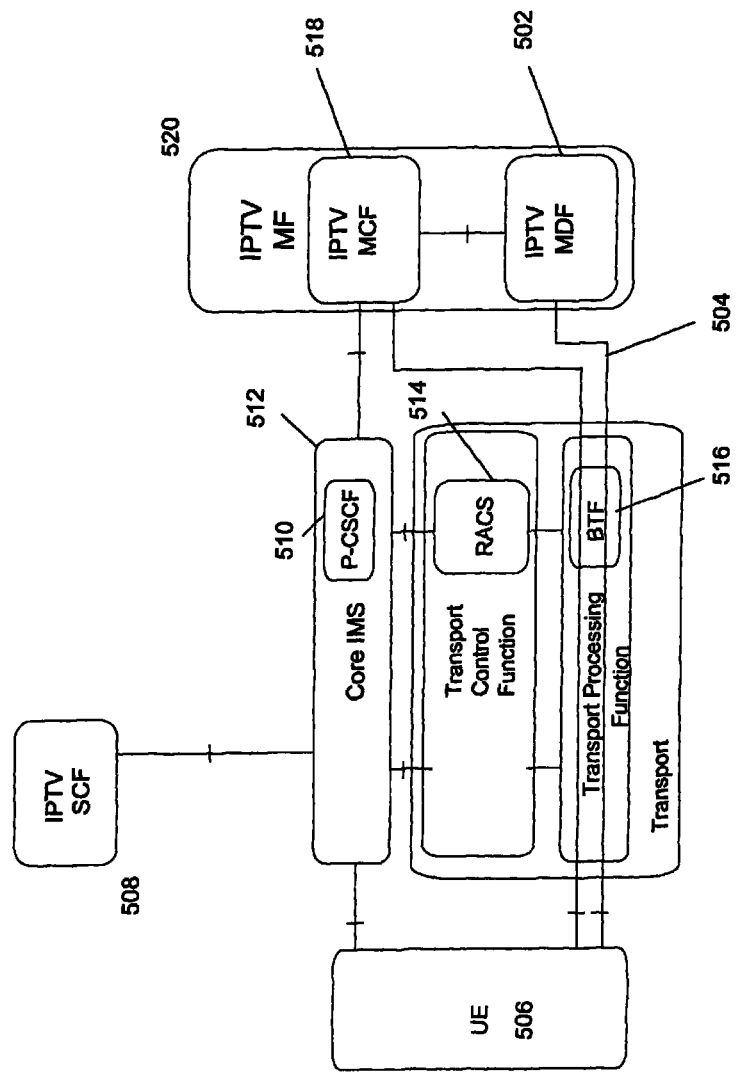
FIG. 5 depicts an exemplary architecture of a system configured for implementing the invention.

In a further embodiment another example of how the synchronisation session may be initiated, is illustrated in more detail. FIG. 5 depicts an exemplary IMS-based IPTV architecture 500 as defined by ETSI TISPAN. The architecture may for example be used for a scenario, wherein two subscribers of an IMS based IPTV service want to watch the same TV program (e.g., a football game) in a synchronized manner and communicate by (video) telephone or chat at the same time. For an acceptable user experience the IPTV streams on both TVs should be substantially synchronized (e.g., to avoid hearing your friend shout 'goal!' seconds before you see the actual goal on the TV).

Figure 6:
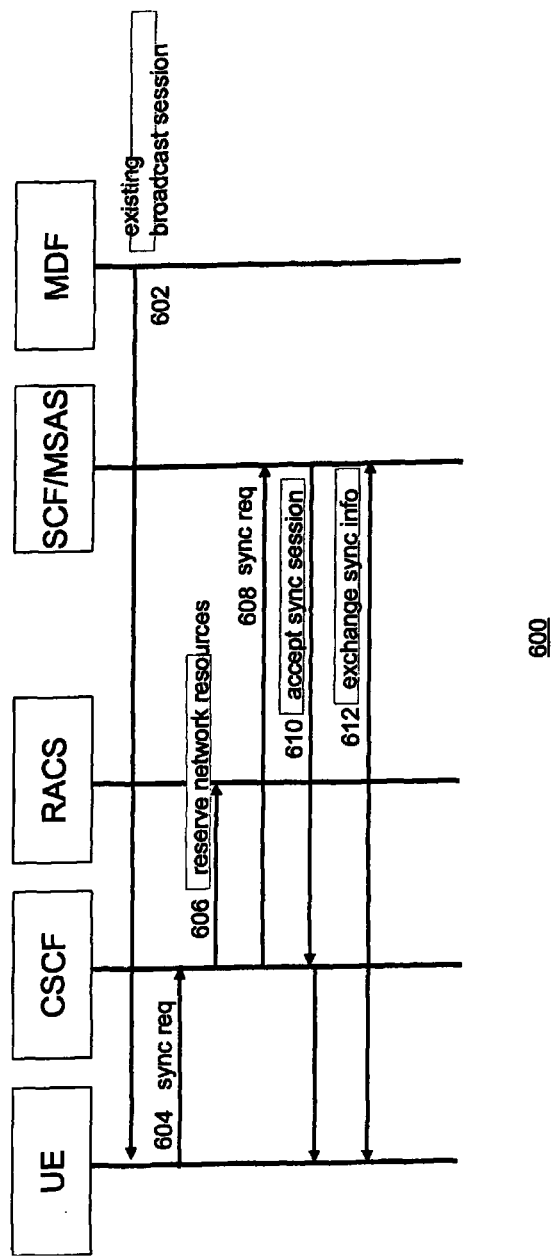
FIG. 6 depicts the flow of information in an exemplary architecture of a system configured for implementing the invention.

In order to achieve the substantial level of synchronization required the following steps illustrated by the flow diagram 600 of FIG. 6 are performed.

First the user may want to enable synchronization for the existing unsynchronized IPTV broadcast session by requesting a session modification (where the Media Distribution Function MDF 502 is the transmitting station and the IPTV broadcast session 504 is the packetized stream)(step 604). The session modification involves the User Equipment UE 506 (terminal) sending a SIP INVITE message to the Service Control Function SCF 508 or vice versa, comprising an updated session description (using the Session Description Protocol SDP). The session description may comprise of information about which IPTV stream should be synchronized (e.g., indicated by the BCServiceId) and the UEs to be involved in the synchronization session. The SIP INVITE message is routed via the Proxy Call Session Control Function (P-CSCF) 510, located in the Core IMS 512 (steps 604, 608), whereby the P-CSCF forwards the session description information to the Resource Admission and Control Subsystem RACS 514 to reserve network resources in the Basic Transport Function BTF 516, in order to guarantee a low-delay communication channel for the exchange of synchronization information (step 606).

Further the SCF 508 (or UE if the SCF initiated the request) may accept the request (step 610) and may instruct the Media Synchronisation Application Server MSAS (Synchronization Unit) to start the synchronization session for inter-destination synchronization. This may be achieved using an internal protocol, if the MSAS is located in the SCF, or alternatively the SIP protocol may be used when for example the MS AS is located in the Media Control Function (MCF) 518 of the IMS architecture. The MCF is part of the IPTV Media Function (MF) 520.

Finally the UEs participating in the inter-destination synchronization (session) send their synchronization status information (comprising media unit reference information of the to-be synchronized stream) to the MSAS, as part of the modified broadcast session (now including a low-delay communication channel reserved by the RACS) (step 612).

The MSAS then calculates the delay information for use in the variable delay unit for each UE and transmits the delay information (synchronization settings instructions) to the participating UEs.

In the exemplary embodiment above, the packetized stream (such as an IPTV broadcast) uses a regular broadcast channel, multi-casted from the Media Distribution Function (MDF), known from the IMS-based IPTV architecture (TS 182 027). This broadcast channel can be relatively slow, due to the various manipulations that the packetized stream may undergo between source and destination. Moreover, it is typically unidirectional. A broadcast session is set up to e.g. reserve bandwidth for the broadcast channel, opening ports and to enable charging. The broadcast session including the synchronisation session according to the embodiment, is preferably a SIP signalling session with a low-delay communication channel for exchanging synchronization information that uses a different communication path. In contrast to the regular broadcast channel, this different communication path is a relatively fast bidirectional low-delay communication channel between the Service Control Function (comprising the MSAS) and the UE (comprising the SC).

The invention is not limited to the embodiments described above, which may be varied within the scope of the accompanying claims.

The invention claimed is:

1. A method for synchronizing outputs of at least two terminals, the method comprising:
    establishing one or more low delay communication channels between the terminals and a synchronization unit, the synchronization unit being comprised in one of the at least two terminals, and the one or more low delay communication channels being established as part of a communication session between the terminals;
    at the synchronization unit, receiving respective synchronization information from each of the terminals via the one or more low delay communication channels, the respective synchronization information comprising indicia of a respective arrival time at each terminal of a respective media unit in a respective input stream;
    the synchronization unit calculating delay information on the basis of the respective synchronization information received from the terminals; and
    transmitting the delay information to at least one of the terminals, the delay information providing a basis for the at least one terminal to delay its output such that the outputs of the terminals are synchronized to within a threshold level.

2. The method according to claim 1, wherein each terminal comprises an input for receiving a multi-media signal and an output for transmitting the multi-media signal to an information presentation unit and wherein each terminal comprises a variable delay unit for delaying the multi-media signal between the input and the output, the method further comprising:
    transmitting a multi-media stream to the input of the terminals, the multi-media stream comprising media units, via a communication channel different than the low delay communication channel;
    delaying the output of the multi-media signal according to the received delay information.

3. The method according to claim 1, wherein the method further comprises:
the synchronization unit receiving synchronization information from each terminal in response to a synchronization request transmitted by the synchronization unit via the low delay communication channel, the synchronization information comprising media unit reference (MUR) information representing a position of a media unit in a multi-media stream at the respective terminals.

4. The method according to claim 3, wherein the MUR information comprises a frame number or a sequence number of a frame received by the terminal at substantially a same time as receiving the synchronization request.

5. The method according to claim 3, wherein the method further comprises:
adding one or more time stamps to the MUR information received from each respective terminal;
obtaining information on a frame rate of the multi-media stream received by the respective terminals; and
calculating the delay information for each terminal on the basis of the frame rate information and the time-stamped MUR information.

6. The method according to claim 3, wherein the method further comprises:
the synchronization unit simultaneously sending one or more synchronization requests via the one or more low delay communication channels to the respective terminals;
obtaining information on a frame rate of the multi-media stream received by the respective terminals; and
calculating the delay information for each terminal on the basis of the frame rate information and the MUR information.

7. The method according to claim 1, wherein the one or more low delay communication channels are established as part of a broadcast session as defined in ETSI TS 182 027.

8. The method according to claim 1, wherein the one or more low delay communication channels are selected from the group consisting of a Voice over IP (VoIP) channel, an USSD based channel over a GSM, a UMTS or LTE network, an QoS-controlled channel in an IMS session, a dedicated channel in a communication session or a broadcast session, a dedicated Ethernet VLAN channel, a dedicated MPLS channel, and a dedicated channel used by an IP Diffserv stream.

9. The method according to claim 1, wherein the synchronization unit is located in a server separate from the terminals or in one or more of the terminals.

10. A system for synchronizing outputs of at least two terminals, the system comprising a synchronization unit connected via one or more low delay communication channels to the at least two terminals, wherein the one or more low delay communication channels are established as part of a communication session between the terminals, and wherein the synchronization unit is comprised in one of the at least two terminals and is configured to (i) receive respective synchronization information from each of the terminals via the one or more low delay communication channels, wherein the respective synchronization information comprises indicia of a respective arrival time at each terminal of a respective media unit in a respective input stream, (ii) calculate delay information on the basis of the respective synchronization information received from the at least two terminals and (iii) transmit the delay information to at least one of the terminals, the delay information providing a basis for the at least one terminal to delay its output such that the outputs of the at least two terminals are synchronized to within a threshold level.

11. The system according to claim 10, wherein each terminal comprises an input for a receiving multi-media signal and an output for transmitting the multi-media signal to an information presentation unit and a variable delay unit for delaying the multi-media signal between the input and the output according to the delay information, the system further comprising a transmitting station transmitting a multimedia stream to the terminals, the multi-media stream comprising media units.

12. A synchronization unit comprising:
a receiver for receiving respective synchronization information from at least two terminals via one or more low delay communication channels, wherein the one or more low delay communication channels are established as part of a communication session between the terminals, and wherein the respective synchronization information comprises indicia of a respective arrival time at each terminal of a respective media unit in a respective input stream;
a processor configured to calculate delay information on the basis of the received respective synchronization information; and,
a transmitter for transmitting the delay information to at least one of the terminals, wherein the delay information provides a basis for the at least one terminal to delay its output such that the outputs of the terminals are synchronized to within a threshold level,
wherein the synchronization unit is comprised in one of the at least two terminals.

13. A terminal comprising:
a receiver;
a transmitter;
a variable delay unit;
one or more computing devices;
memory accessibly by the one or more computing devices; and
software code portions stored in the memory that when executed by the one or more computing devices cause the terminal to carry out functions including:
the receiver receiving a synchronization request from a synchronization unit, delay information via one or more low delay communication channels, and a multi-media stream via a communication channel different from the low delay communication channel, wherein the one or more low delay communication channels are established as part of a communication session between the terminals,
the transmitter transmitting synchronization information via the one or more low delay communication channels to the synchronization unit, and transmitting at least one media unit in the received multi-media stream to an information presentation unit, wherein the synchronization information comprises indicia of an arrival time at the terminal of a media unit in the multi-media stream, and
the variable delay unit delaying transmission of the at least one media unit to the information presentation unit in accordance with the received delay information, wherein the delay information provides a basis for the terminal to synchronize to within a threshold level its transmission of the at least one media unit with transmission from a different terminal of a different media unit,
wherein the terminal further comprises the synchronization unit, and the functions further include the synchronization unit calculating delay information on the basis of the synchronization information.

14. The terminal according to claim 13, wherein the terminal is a set-top box, a home computer, a mobile device, or a gaming console.

15. The terminal according to claim 13, wherein the terminal further comprises the synchronization unit, and the functions further include the synchronization unit calculating delay information on the basis of the synchronization information.

16. An article of manufacture including a non-transitory computer readable medium having instructions stored thereon that, in response to execution by a computing device, cause the computing device to perform operations comprising:

establishing one or more low delay communication channels between at least two terminals and a synchronization unit as part of a communication session between the terminals;

at the synchronization unit, receiving respective synchronization information from each of the terminals via the one or more low delay communication channels, the respective synchronization information comprising indicia of a respective arrival time at each terminal of a respective media unit in a respective input stream, wherein the synchronization unit is comprised in one of the at least two terminals;

calculating delay information on the basis of the respective synchronization information received from the terminals; and transmitting the delay information to at least one of the terminals, the delay information providing a basis for the at least one terminal to delay its output such that the outputs of the terminals are synchronized to within a threshold level.

17. The article of manufacture according to claim 16, the operations further comprising transmitting a synchronization request to the at least two terminals via the low delay communication channel and responsively receiving the synchronization information from the terminals;

wherein the synchronization information comprises media unit reference (MUR) information representing a position of a media unit in a multi-media stream at the respective terminals.

18. The article of manufacture according to claim 17, wherein the MUR information comprises a frame number or a sequence number of a frame received by the terminal at substantially a same time as receiving the synchronization request.

19. The terminal according to claim 13, wherein the synchronization information comprises media unit reference (MUR) information representing a position of a media unit in a multi-media stream at the terminal.

20. The terminal according to claim 19, wherein the MUR information comprises a frame number or a sequence number of a frame received by the terminal at substantially a same time as receiving the synchronization request.

21. The method according to claim 1, wherein establishing the one or more low delay communication channels comprises establishing the one or more low delay communication channels according to a protocol that specifies how to set up and maintain a low delay communication channel, and wherein transmission of the synchronization information over the one or more low delay communication channels is carried out according at least to the protocol.

22. A method for synchronizing outputs of two or more terminals, the method comprising:

establishing one or more low delay communication channels between the terminals or more terminals and a synchronization unit, the synchronization unit being comprised in one of the at least two terminals, and the one or more low delay communication channels being established as part of a communication session between the terminals;

at the synchronization unit, receiving respective synchronization information from each of the two or more terminals via the one or more low delay communication channels, the synchronization information from at least one of the two or more terminals comprising an indication of a relative position of a respective media unit in a respective input stream of the at least one of the two or more terminals;

at the synchronization unit, determining arrival time information associated with the arrival of the respective synchronization information;

at the synchronization unit, calculating delay information on the basis of the respective synchronization information received from the two or more terminals and the arrival time information associated with the arrival of the respective synchronization information; and transmitting the delay information to at least one of the two or more terminals, the delay information providing a basis for the at least one of the two or more terminals to delay its output such that outputs of the two or more terminals are synchronized to within a threshold level.

* * * * *